July 18, 1950     N. E. COUSINEAU     2,516,046
SCALE ATTACHMENT
Filed June 26, 1946
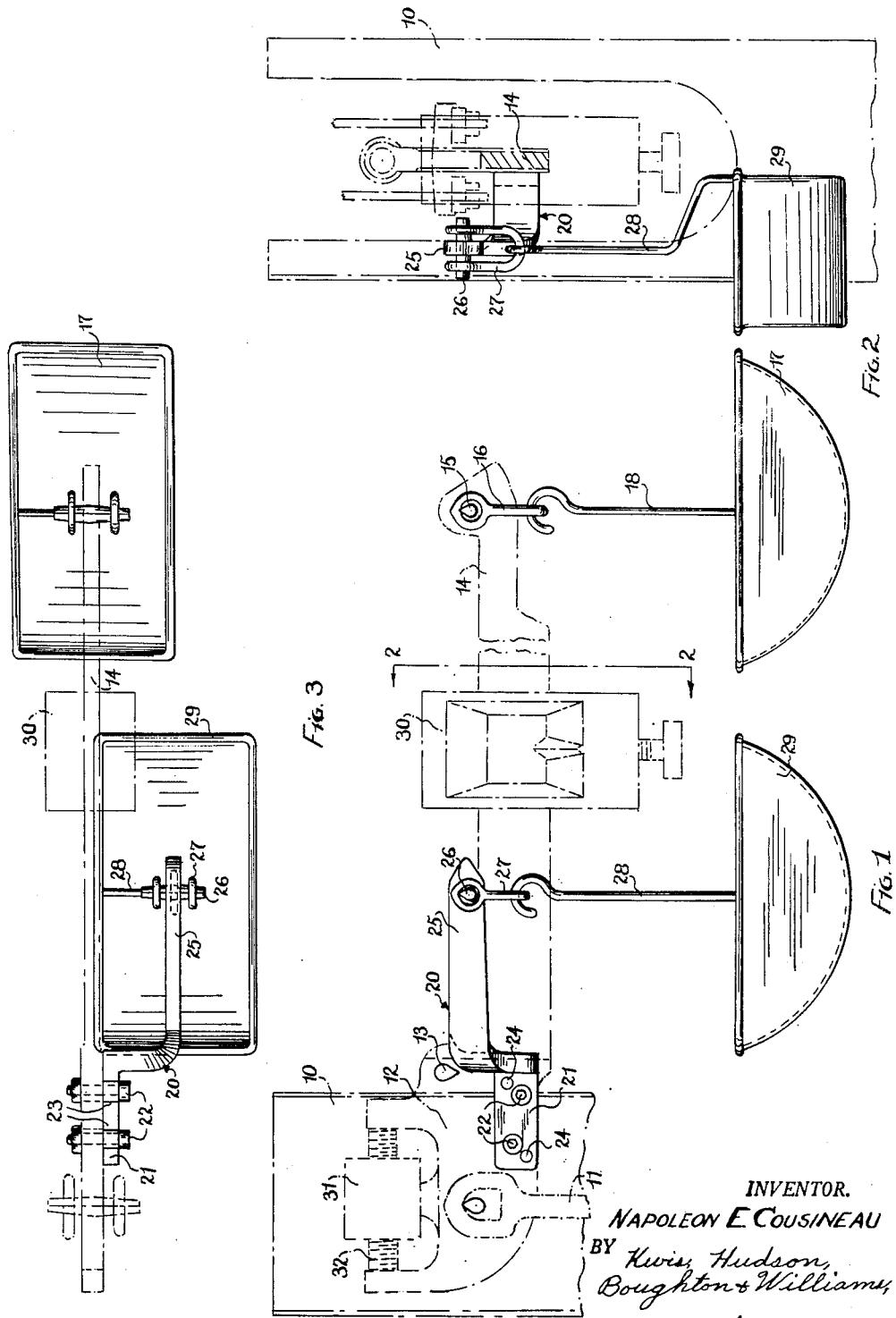
INVENTOR.
NAPOLEON E. COUSINEAU
BY Kwin, Hudson,
Boughton & Williams,
ATTORNEYS Patented July 18, 1950

2,516,046

UNITED STATES PATENT OFFICE 2,516,046

SCALE ATTACHMENT

Napoleon E. Cousineau, Cleveland, Ohio

Application June 26, 1946, Serial No. 679,488

3 Claims. (Cl. 265—30)

This invention relates to improvements in scale attachments, and has to do with a simple attachment adapted to be secured to the beam of an ordinary platform scale or bench scale for converting it into a counting scale.

It is generally recognized to be entirely feasible to remove the counterpoise at the free end of a scale beam and substitute a pan in order to convert the scale to a counting scale. Such an arrangement is practical and useful, but it has limitations in that a scale so equipped is adapted only for counting articles in large ratio. In accordance with the present invention an additional fixed ratio pan is adapted to be mounted at an intermediate point between the beam fulcrum and its free end in order to provide counting in ratios of 10 or 20 for example. The mounting of this additional pan is so arranged as not to interfere with the sliding poise on the scale beam, and also so that the mounting and pan will be approximately self-balancing.

One of the objects of the invention therefore is the provision of a simple and inexpensive means for converting an ordinary weighing scale to an efficient counting scale.

Other objects and features of novelty will appear as I proceed with the description of that embodiment of the invention which, for the purposes of the present application, I have illustrated in the accompanying drawing, in which Fig. 1 is a fragmental side elevational view of a platform scale upon which my counting attachment is mounted.

Fig. 2 is a vertical sectional view taken substantially on the line 2—2 of Fig. 1, and Fig. 3 is a plan view corresponding to Fig. 1.

In the drawing the column of an ordinary platform scale is indicated at 10. A steelyard rod 11 within column 10 has the usual connection with the butt end 12 of a weighing beam that is mounted on the supporting column 10 with its fulcrum at 13. The scale part of the beam is shown at 14. At its extremity it is provided with a knife edge 15 which extends through the beam and supports a loop 16 from which may be hung the usual counterpoise commonly employed in weighing scales, but not shown herein, or a pan 17 having a supporting rod 18 with a hooked upper end. Preferably this pan with its supporting rod should be of identical weight with a counterpoise, and these parts should be thus interchangeably usable without affecting balance.

The attachment of the present invention comprises a bracket 20, the mounting portion 21 of which is adapted to be secured to the butt end 12 of the beam by any suitable fastenings such as screws or bolts 22. Holes are drilled in the butt portion of the beam to take these bolts, and the corresponding holes in the bracket are preferably elongated somewhat, as indicated at 23, to allow for adjustment of the bracket to a limited extent. When the exact position of the bracket has been determined by trial dowel holes may be drilled through the bracket part 21 and the butt end 12 of the beam and dowel pins 24 inserted, so that thereafter in case the bracket is removed at times it may be reassembled upon the beam in precisely the proper position.

Bracket 20 includes in addition to its mounting part 21 an offset arm 25 disposed substantially parallel to the beam 14 and extending away from the fulcrum 13 in the direction of the free end of the beam.

Arm 25 carries a knife edge 26 projecting from both sides of the arm upon which is hung a loop 27 that supports the upper hooked end of a rod 28 which supports a pan 29 that may be identical in shape and size with pan 17.

On the scale beam 14 there is the usual sliding poise 30, which is movable over the graduated portion of the beam to the full extent necessary for ordinary weighing operations, the offset arm 25 and the pan supporting rod 28 being spaced laterally from the beam far enough to clear the poise when it is moved toward or into zero position.

The mounting portion 21 of the bracket on one side of fulcrum 13 may be proportioned to substantially balance the arm 25 and pan 29 on the opposite side of the fulcrum, and any inaccuracy that may be encountered may be cured by adjustment of a cylindrical weight 31 upon its mounting screw 32.

The operation of the scale with the two pans 17 and 29 attached thereto will be apparent to those skilled in the art. For example a single article in pan 17 may balance 100 similar articles on the platform of the scale, and a single article in pan 29 may balance 10 such articles on the platform. If it is desired to count out 550 articles for example in a container placed upon the platform of the scale, the weight of the container may be first balanced by adjustment of the sliding poise 30. Then 5 articles may be placed in each of the two pans, whereupon the container may be filled with similar articles to the extent necessary to effect a balance, and the number of such articles in the container will then be 550.

In the foregoing description I have necessarily gone somewhat into detail in order to explain fully the particular embodiments of the invention herein illustrated, but I desire it to be understood that such detail disclosures are not to be construed as amounting to limitations, except as they may be included in the appended claims.

Having thus described my invention, I claim:

1. In a scale of the character described, a beam, a beam support, a fulcrum thereupon, a sliding poise on said beam, and a fixed ratio counting attachment comprising a bracket carried by said beam on the butt side thereof, said bracket having an arm spaced from said beam extending away from said fulcrum in the direction of the free end of said beam, and a pan depending from said arm, the mass of said pan and arm on the weight side of said fulcrum times its lever arm balancing the mass of the mounting portion of the bracket times its lever arm on the other side of said fulcrum.

2. In a scale of the character described, a beam, a beam support, a beam fulcrum thereupon, a sliding poise on said beam, and a fixed ratio counting attachment comprising a bracket attached to the beam on the butt side of said fulcrum; said bracket having an offset arm disposed alongside the beam on the opposite side of said fulcrum and a pan depending from said arm, said arm and pan being so disposed as to permit said sliding poise to be placed in zero position the mass of said pan and arm on the weight side of said fulcrum times its lever arm balancing the mass of the mounting portion of the bracket times its lever arm on the other side of said fulcrum.

3. A counting attachment for a weighing scale of the usual beam type, wherein a poise is mounted to slide on the beam from zero position to maximum position, said attachment comprising a bracket having a mounting portion to one side of a point adapted for vertical alignment with the beam fulcrum, said mounting portion being adapted to be secured to the beam on the butt side thereof, said bracket having an arm offset from said mounting portion and extending away from said point in a direction opposite that of said mounting portion, and a pan adapted to be hung from the free end of said arm, the mass of said pan and arm for the weight side of the fulcrum times its lever arm being adapted to balance the mass of said mounting portion times its lever arm on the other side of said fulcrum point.

NAPOLEON E. COUSINEAU.

REFERENCES CITED

The following references are of record in the file of this patent:

UNITED STATES PATENTS

| Number | Name | Date |
|---|---|---|
| 1,741,416 | Hem | Dec. 31, 1929 |
| 2,250,294 | Carliss | July 22, 1941 |

FOREIGN PATENTS

| Number | Country | Date |
|---|---|---|
| 327,920 | Great Britain | Apr. 17, 1930 |